United States Patent
Fischer (10) Patent No.: US 9,835,430 B2
(45) Date of Patent: Dec. 5, 2017

(54) POSITION-MEASURING DEVICE

(71) Applicant: DR. JOHANNES HEIDENHAIN GmbH, Traunreut (DE)

(72) Inventor: Peter Fischer, Rimsting, DE (US)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 200 days.

(21) Appl. No.: 14/856,610

(22) Filed: Sep. 17, 2015

(65) Prior Publication Data
US 2016/0102958 A1   Apr. 14, 2016

(30) Foreign Application Priority Data

Oct. 14, 2014 (EP) .................................. 14188801

(51) Int. Cl.
*G01B 3/10* (2006.01)
*G01D 5/244* (2006.01)

(52) U.S. Cl.
CPC ....... *G01B 3/1061* (2013.01); *G01D 5/24485* (2013.01); *G01B 3/10* (2013.01)

(58) Field of Classification Search
CPC ..... G01B 3/1061; G01B 3/10; G01D 5/24485
USPC .... 33/706–708, 1 M, 1 R, 1 PT; 250/231.13, 250/237 G
See application file for complete search history.

(56) References Cited

U.S. PATENT DOCUMENTS

| | | | | | |
|---|---|---|---|---|---|
| 3,579,836 A | * | 5/1971 | Kraus | ................. | B23Q 11/085 33/1 R |
| 3,627,430 A | * | 12/1971 | Miller | ................... | G01B 11/00 356/396 |
| 4,367,589 A | * | 1/1983 | Mainka | ................... | B43L 13/08 33/1 N |
| 4,500,097 A | * | 2/1985 | Sakamoto | .......... | G01D 5/34769 277/345 |
| 4,663,851 A | * | 5/1987 | Feichtinger | .......... | G01D 5/3473 250/231.14 |
| 4,739,164 A | * | 4/1988 | Burkhardt | ................ | G01D 3/08 250/237 G |

(Continued)

FOREIGN PATENT DOCUMENTS

| | | |
|---|---|---|
| DE | 3633573 C1 | 2/1988 |
| EP | 2636991 A1 | 9/2013 |
| WO | WO 2012114168 A1 | 8/2012 |

*Primary Examiner* — R. A. Smith
*Assistant Examiner* — Tania Courson
(74) *Attorney, Agent, or Firm* — Leydig, Voit & Mayer, Ltd.

(57) ABSTRACT

A position-measuring device includes a first assembly and a second assembly. The first assembly, installable on a first object, has a profiled element that bears a scale having a first and second measuring graduation. The second assembly, installable on a second object, has a first scanning unit that is movable along a travel path in a measuring direction to scan the first measuring graduation. A position of the first object relative to the second object is therefore measurable. A second scanning unit is mounted on the profiled element so as to enable the second measuring graduation to be scanned, and is positioned in a way that allows the first scanning unit to traverse collision-free along the travel path at a distance spaced apart from the second scanning unit orthogonally to the measuring direction such that a displacement of the scale relative to the first object is measurable.

15 Claims, 5 Drawing Sheets

(56) References Cited

U.S. PATENT DOCUMENTS

| | | | | |
|---|---|---|---|---|
| 4,808,048 A | | 2/1989 | Miller | |
| 5,375,338 A | * | 12/1994 | Nelle | G01B 5/0014 33/702 |
| 5,651,187 A | * | 7/1997 | Affa | G01D 5/2457 33/706 |
| 6,912,797 B2 | * | 7/2005 | Rodi | G01D 5/2458 33/706 |
| 7,013,575 B2 | * | 3/2006 | Strasser | G01D 5/2495 33/706 |
| 7,017,274 B2 | * | 3/2006 | Stobbe | G01D 5/145 324/207.25 |
| 7,057,160 B2 | * | 6/2006 | Ito | G01D 5/34715 250/231.13 |
| 7,284,338 B2 | * | 10/2007 | Hager | G01D 11/305 33/1 PT |
| 7,473,886 B2 | * | 1/2009 | Benner | G01D 5/347 250/231.13 |
| 7,596,880 B2 | * | 10/2009 | Martin | G01D 5/34761 250/237 G |
| 7,858,922 B2 | * | 12/2010 | Holzapfel | G01D 5/2457 250/231.13 |
| 8,156,658 B2 | * | 4/2012 | Kummetz | G01D 5/34753 33/702 |
| 8,650,769 B2 | * | 2/2014 | Speckbacher | G01D 5/34707 33/706 |
| 8,844,152 B2 | * | 9/2014 | Frank | G01D 5/20 29/428 |
| 8,854,630 B2 | * | 10/2014 | Benner | G01D 5/34715 356/614 |
| 9,080,857 B2 | * | 7/2015 | Huber | G01B 11/14 |
| 9,234,734 B2 | * | 1/2016 | Schmoller | G01B 5/02 |
| 9,618,368 B2 | * | 4/2017 | Schlichtner | G01D 5/2457 |
| 2002/0170200 A1 | * | 11/2002 | Rodi | G01D 5/2458 33/707 |
| 2008/0062432 A1 | * | 3/2008 | Sandig | G01D 5/38 356/499 |

\* cited by examiner

POSITION-MEASURING DEVICE

CROSS-REFERENCE TO PRIOR APPLICATION

Priority is claimed to European Patent Application No. EP 14 188 801.6, filed on Oct. 14, 2014, the entire disclosure of which is hereby incorporated by reference herein.

FIELD

The present invention relates to a position-measuring device including a first assembly having a scale with a measuring graduation and a second assembly having a movable scanning unit, where the first assembly is installed on a first object to be measured and the second assembly is installed on a second object to be measured.

BACKGROUND

Position-measuring devices of this kind are used, in particular, in machine tools for measuring the position of a tool relative to a workpiece to be machined, in coordinate measuring machines for determining the position and dimensions of test objects, as well as in the semiconductor industry. In this context, the scale is directly mounted on a first object, for example, the drive unit (for example, linear motor), or the scale is mounted on a component driven by the drive unit. Opposite the moving scale, the scanning unit of the position-measuring device is affixed to a second object, whose position is to be measured, in a stationary manner.

The temperature-induced displacement of the scale relative to the first object is to be taken into account during the position measurement. To this end, the International Patent Application WO 2012/114168 A1 discusses using a probe at the reference point of the scale to directly measure the displacement of the scale. Temperature sensors are assigned to the scale in order to record the temperature-induced displacement of the scale outside of the reference point. At these positions outside of the reference point, the temperature-induced displacement of the scale can be ascertained from the measured temperature and the thermal expansion coefficient of the scale material.

SUMMARY

In an embodiment, the present invention provides a position-measuring device having a first assembly and a second assembly. The first assembly has a profiled element that bears a scale having a first measuring graduation and a second measuring graduation. The first assembly is installable on a first object to be measured. The second assembly has a first scanning unit that is movable along a travel path in a measuring direction so as to scan the first measuring graduation. The second assembly is installable on a second object to be measured such that a position of the first object relative to the second object is measurable. At least one second scanning unit is mounted on the profiled element so as to enable the second measuring graduation to be scanned. The at least one second scanning unit is positioned in a way that allows the first scanning unit to traverse collision-free along the travel path at a distance spaced apart from the second scanning unit orthogonally to the measuring direction such that a displacement of the scale relative to the first object is measurable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a compactly designed position-measuring device that will make it possible to determine the temperature-induced displacement of the scale, thus the linear expansion of the scale, as accurately as possible.

The position-measuring device, in an embodiment, includes a first assembly and a second assembly; the first assembly having a profiled element that bears a scale having a first measuring graduation; and the second assembly having a first scanning unit; and, to measure the position of a first object relative to a second object, the first assembly being installable on the first object to be measured, and the second assembly on the second object to be measured; and the first scanning unit being movable along a travel path in the measuring direction and, in the process, scanning the first measuring graduation of the scale; the scale having a second measuring graduation, and at least one second scanning unit being mounted on the profiled element, the second scanning unit being able to scan the second measuring graduation; and, to measure the displacement of the scale relative to the first object, the second measuring graduation being positioned in a way that allows the first scanning unit to traverse collision-free along the travel path, at a distance spaced apart from the second scanning unit orthogonally to the measuring direction.

Embodiments of the present invention are very advantageously suited for position-measuring devices that are used for long measuring lengths. In such cases, a plurality of second scanning units, which are mutually spaced apart in the measuring direction, are provided on the profiled element.

It is advantageous that the second scanning unit be resiliently joined in the measuring direction to the profiled element, and that it be designed to be fastened in a stationary configuration to the first object by featuring a bore to be used for bolting onto the first object, for example. This measure makes it possible for the scale displacement to be measured relative to the first object to be measured without the profiled element influencing the measurement operation of the position-measuring device. A flexure joint, which is deflectable in the measuring direction, may realize the elastic connection between the second scanning unit and the profiled element.

An especially space-saving and protected configuration of the second scanning unit is ensured by the profiled element featuring a recess within which the second scanning unit is installed.

The profiled element is preferably a hollow profiled element in whose interior space, the scale is configured, and the interior space forms the travel path of the first scanning unit. It is particularly advantageous in this case that the second scanning unit be installed in a recess of the profiled element, and that a seal be provided between the profiled element and the second scanning unit to seal the interior space from the ambient environment.

It is advantageous that the scale be immovably fixed in position (fixed point) at solely one single position on the profiled element and, in the remaining region, be configured on the profiled element in a way that allows it to expand in the measuring direction relative to the profiled element. At least one second scanning unit is configured at a position where the scale is able to expand in the measuring direction relative to the profiled element. If the scale is a scale tape, it may then be fixedly secured at one end to the profiled element (fixed point) and tensioned at the other end.

The relative displacement of the scale and the profiled element in the measuring direction outside of the fixed point is made possible in that the scale rests on an upper surface of the profiled element or with the interposition of an elastic layer, for example in the form of an elastic adhesive or an oil film.

It is also advantageous for the scale tape to be configured in a longitudinal groove of the profiled element.

The scale displacement value measured by this position-measuring device designed in accordance with the present invention in comparison with one of the second scanning units and, thus, in comparison with the first object may be used to correct the position measured by the first scanning unit.

The position of a first object 100 relative to a second object 200 is to be measured in measuring direction X by the position-measuring device. This position-measuring device includes a first assembly 1 and a second assembly 2.

First assembly 1 includes a profiled element 10 that bears a scale 40 having a measuring graduation 41 that is scanned during the position measurement by a scanning unit 20 which is movable along a travel path in measuring direction X and, in the process, scans measuring graduation 41 of scale 40. To measure positions, first assembly 1 is mounted on first object 100 to be measured.

Second assembly 2 includes scanning unit 20, which is mounted on second object 200, to measure the position of first object 100 relative to second object 200. Scanning unit 20 is designed for the non-contact scanning of measuring graduation 41 of scale 40. An advantageous exemplary embodiment provides that scanning unit 20 be designed for opto-electric scanning and include a light source 22 and a detector 23. In response to scanning of measuring graduation 41, scanning unit 20 generates position-dependent electrical scanning signals in a generally known manner.

The present invention provides that the position-measuring device be additionally designed for recording the displacement of scale 40 relative to first object 100 at at least one measuring position P1, P2. To this end, scale 40 has a further measuring graduation 42. For the non-contact scanning of this further measuring graduation 42, first assembly 1 includes at least one scanning unit 30.

This further scanning unit 30 (also referred to as second scanning unit 30) is designed for non-contact, in particular opto-electric scanning and includes at least one light source 31 and one detector 32. Detector 32 may be a detector array having detector elements configured in measuring direction X or having detector elements configured in measuring direction X and orthogonally thereto.

Figure 1:
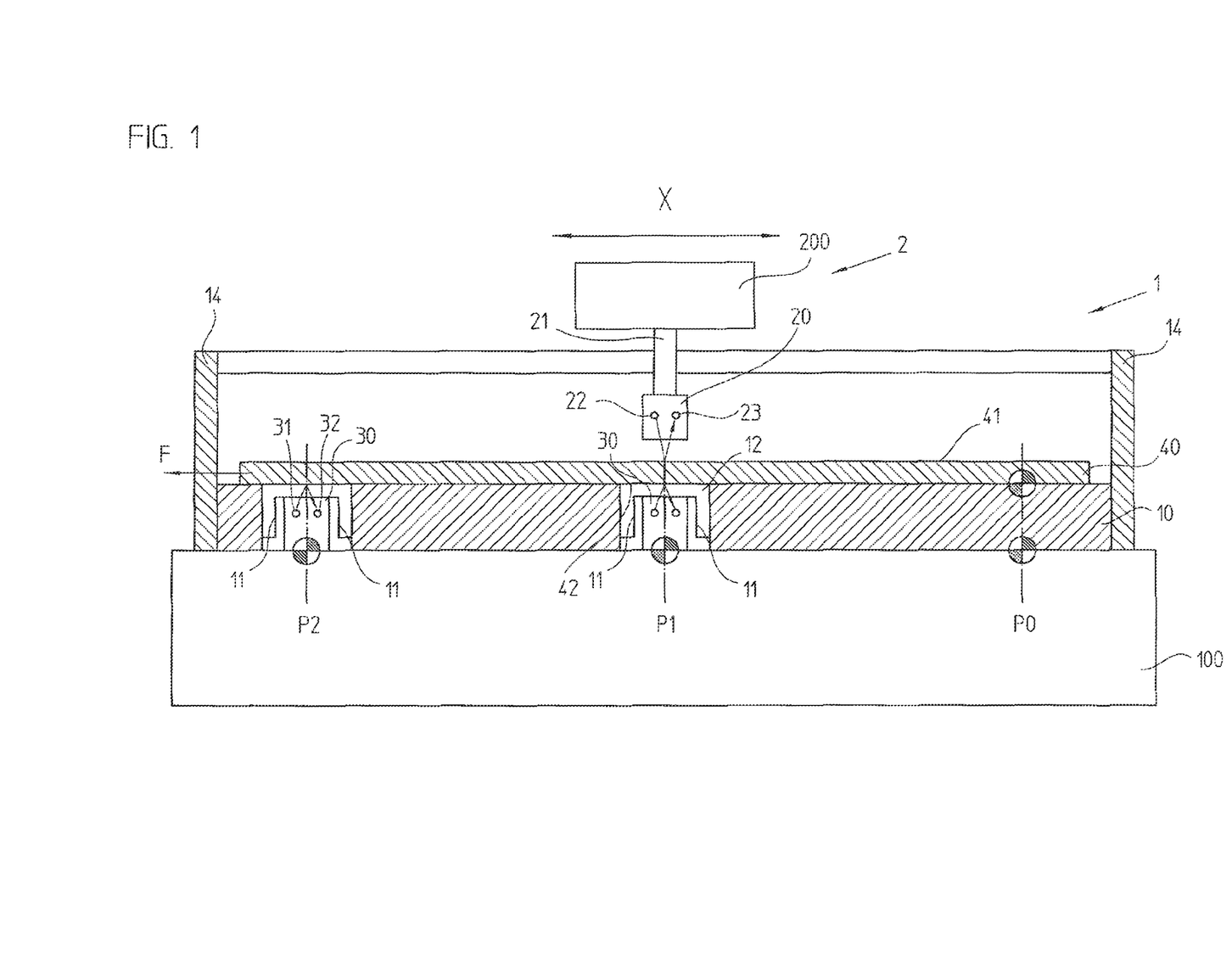
FIG. 1 shows a schematic representation of a position-measuring device according to an embodiment of the present invention.

It is particularly advantageous that the position-measuring device be designed for recording the displacement of scale 40 relative to first object 100 at a plurality of positions P1 and P2 that are mutually spaced apart in measuring direction X. For this, as illustrated in FIG. 1, the position-measuring device features one of further scanning units 30 at each of positions P1 and P2. Scanning units 30 are designed for being immovably fixed at these positions P1 and P2, in each case on first object 100.

To measure the position in measuring direction X, the at least one further scanning unit 30 is configured during the measuring operation in a way that allows first scanning unit 20 to traverse collision-free along the travel path, at a distance spaced apart from second scanning unit 30 orthogonally to measuring direction X. In this context, "at a distance spaced apart orthogonally to measuring direction X" means that scanning unit 30 is able to move past scanning unit 20.

Figure 2:
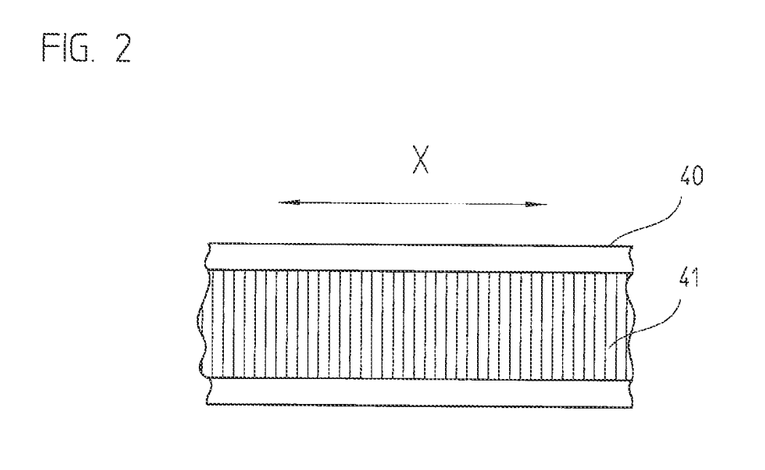
FIG. 2 shows a first view of the scale of the position-measuring device from FIG. 1.
Figure 3:
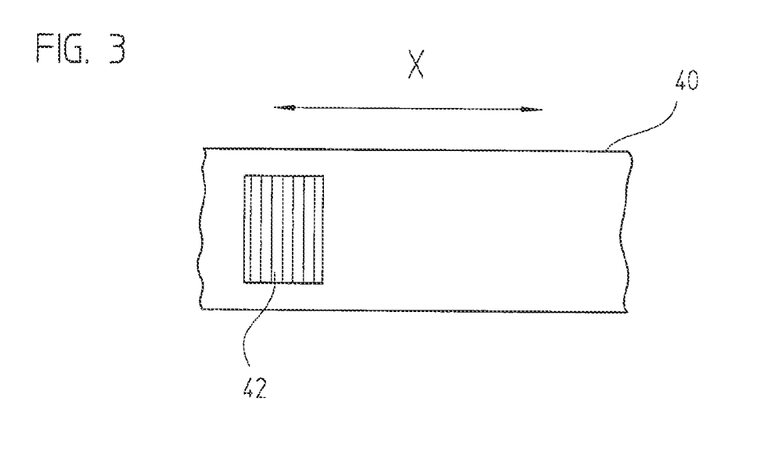
FIG. 3 shows a second view of the scale of the position-measuring device from FIG. 1.

Measuring graduation 41 is configured on one side of scale 40. A plan view is shown in FIG. 2. Further measuring graduation 42 is configured on the rear side of scale 40. FIG. 3 shows a view of the rear side of scale 40. Further measuring graduation 42 is provided at least in the area of further scanning units 30 at positions P1, P2 on scale 40. This further measuring graduation 42 may be produced on scale 40 using known lithographic methods. Alternatively, this second measuring graduation 42 may be disposed on a strip.

In each case, one of these strips is partially fastened to scale 40, in particular adhesively bonded thereto, at positions P1, P2.

Figure 7:
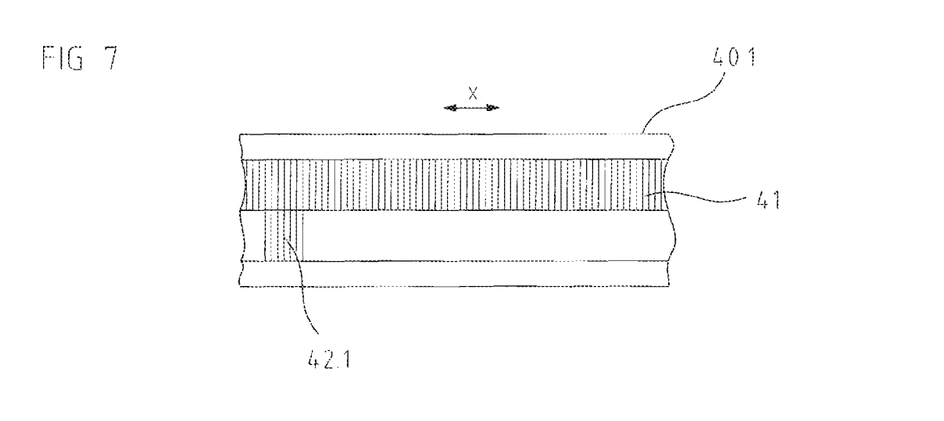
FIG. 7 shows an alternative embodiment of a scale.

Alternatively, further measuring graduation 42.1 may also be configured next to measuring graduation 41, thus, considered in one direction, orthogonally to measuring direction X, next to measuring graduation 41, on a shared side of scale 40.1. FIG. 7 shows a plan view of a scale 40.1 designed in this way.

For the sake of position measuring, the present invention makes it possible for scale 40 to be scanned by scanning unit 20 at one position, and to be scanned by further scanning unit 30 at the same position or at least as proximally as possible thereto. Thus, the displacement of scale 40 may be captured at the position, respectively as proximally as possible to the position where the relative position of the two objects 100 and 200 is also measured. In FIG. 1, this is the instantaneous position denoted by P1.

A compact and readily manageable design of the position-measuring device is obtained in that first assembly 1 includes a profiled element 10 which, on the one hand, serves as a carrier for scale 40 and on which, on the other hand, the at least one further scanning unit 30 is mounted. FIG. 1 schematically shows that a plurality of further scanning units 30, which are mutually spaced apart in measuring direction X, are mounted on profiled element 10.

Profiled element 10 is a hollow profiled element in whose interior space, scale 40 is disposed. Scanning unit 20 is configured within this hollow profiled element and is movable in measuring direction X, so that the interior space forms the travel path of scanning unit 20 in measuring direction X. Scanning unit 20 may be mounted in a fixed position by a mounting base 21 on second object 200 to be measured. Hollow profiled element 10 protects scale 40, as well as scanning unit 20 at least laterally from harmful environmental influences. Hollow profiled element 10 is sealed at each of the ends thereof by a cover 14.

Profiled element 10 has recesses 12 within each of which one of scanning units 30 is installed. Disposed between profiled element 10 and scanning unit 30, which is installed in recess 12, is a seal 13.

Scale 40 is in the form of a scale tape, preferably a metal scale tape, in particular a steel scale tape. Scanning unit 20 scans measuring graduation 41 that faces into the hollow space of hollow profiled element 10.

The at least one further scanning unit 30 is configured on hollow profiled element 10 in a way that allows it to scan measuring graduation 42 applied to the rear side of scale 40. Scanning unit 30 is designed and configured to be immovably attachable to first object 100 to be measured, in particular boltable thereto by a screw 33.

Figure 5:
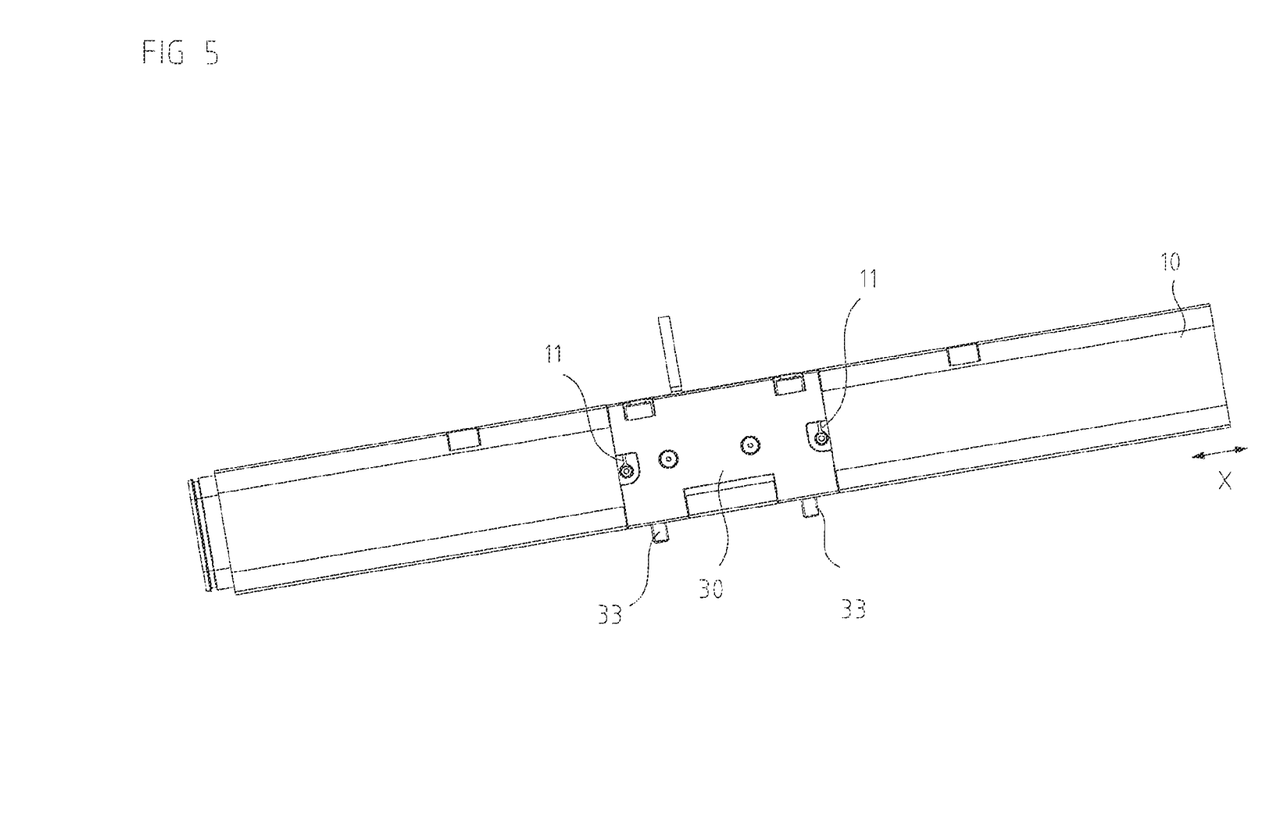
FIG. 5 shows a view of the position-measuring device in accordance with FIG. 4.
Figure 6:
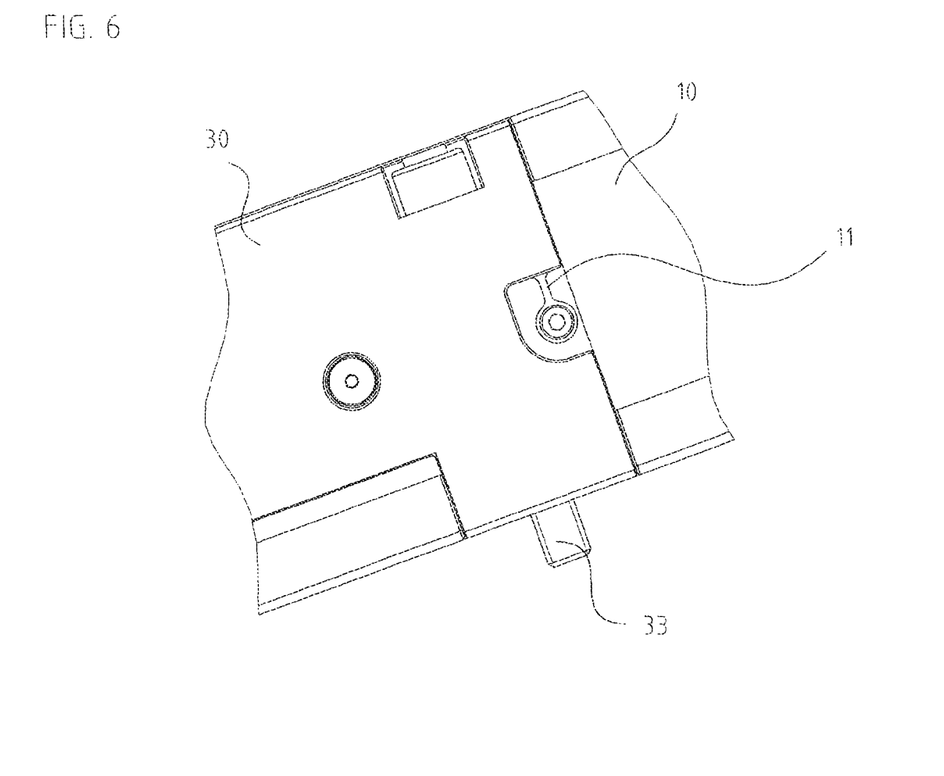
FIG. 6 shows an enlarged representation from FIG. 5.

On the one hand, scanning unit 30 is resiliently joined in measuring direction X to hollow profiled element 10, and, on the other hand, designed to be immovably attachable to first object 100. This ensures that hollow profiled element 10 does not exert any constraining forces on scanning unit 30 that invalidate the measurement of the displacement between first object 100 and scale 40. In the specific exemplary embodiment, an element that is resilient in measuring direction X, in particular in the form of a flexure joint 11, is configured for this purpose between scanning unit 30 and hollow profiled element 10. On the one hand, flexure joint 11 holds scanning unit 30 on profiled element 10 and, on the other hand, permits a movement between scanning unit 30 and profiled element 10 in measuring direction X. As is illustrated in FIGS. 1 and 5, one of flexure joints 11 is configured on each of the two sides of scanning unit 30.

Scale 40 may be differently configured on profiled element 10. One option provides that it be decoupled over the entire length thereof from profiled element 10. This may be realized by it resting simply on profiled element 10 or being attached thereto via a decoupling layer. The decoupling layer may be an elastic adhesive or a liquid film. One especially advantageous option for mounting scale 40 on profiled element 10 provides that it be immovably fixed in position thereon at solely one single position PO and, in the remaining region, be fastened thereto in a way that allows it to expand relative to profiled element 10 in measuring direction X. At positions P1, P2 of said second scanning units 30 the scale is longitudinally movable in measuring direction X relative to profiled element 10.

Figure 4:
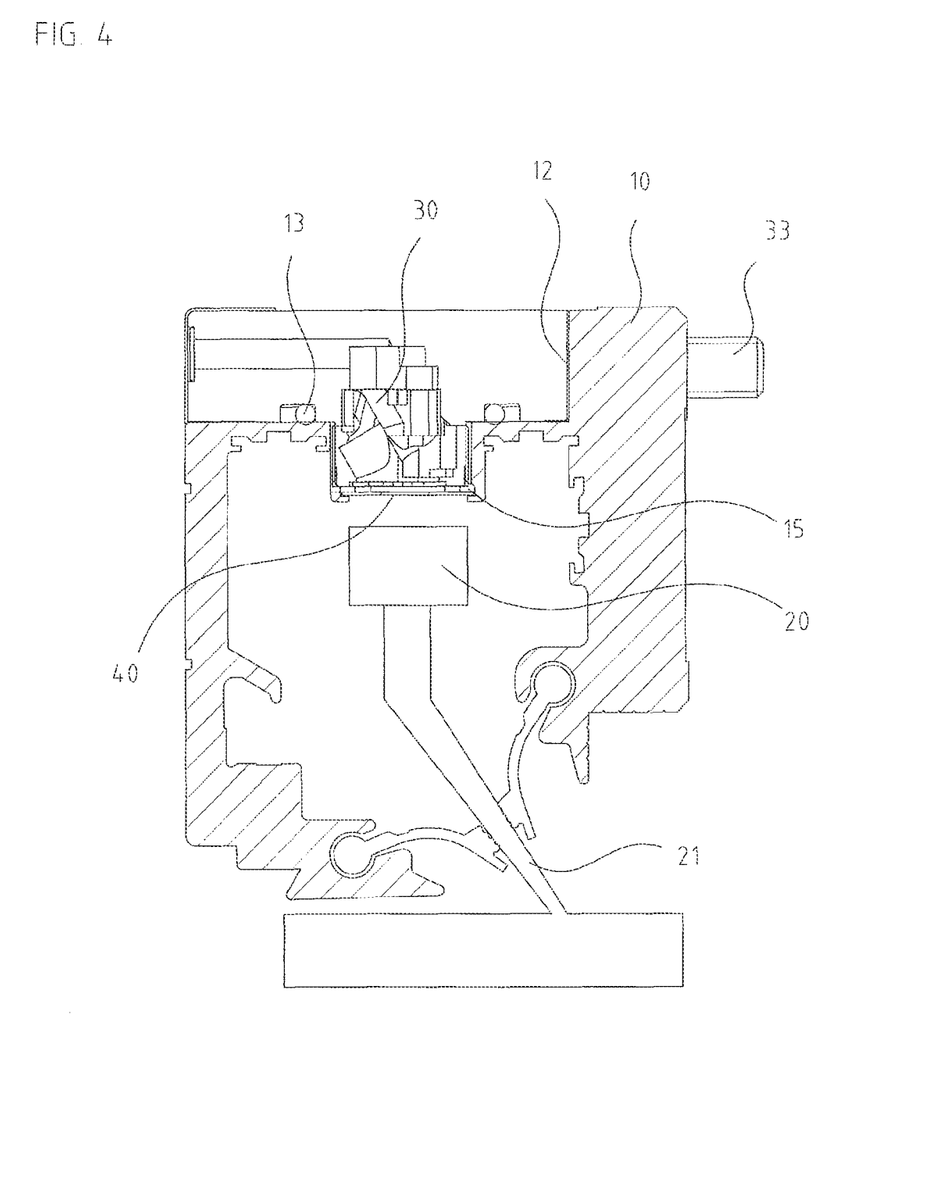
FIG. 4 shows a cross section of the position-measuring device in detail.

If the position measuring device is to be designed for particularly long measuring lengths, then scale 40 is preferably a scale tape that is configured in a longitudinal groove 15 of profiled element 10, longitudinal groove 15 extending laterally around scale tape 40 to allow insertion thereof into the same from one end of profiled element 10. FIG. 4 shows an example of this type of longitudinal groove 14. When working with long measuring lengths, scale tape 40 is preferably immovably fixed at one end PO to profiled element 10 and, at the other end, tensioned in measuring direction X by a tensioning device configured on profiled element 10. Thus, in FIG. 1, F denotes the tensioning force acting on scale tape 40.

First measuring graduation 41, as well as second measuring graduation 42 may be in the form of an incremental or absolute measuring graduation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
   a first assembly having a profiled element that bears a scale having a first measuring graduation and a second measuring graduation, the first assembly being installable on a first object to be measured;
   a second assembly having a first scanning unit that is movable along a travel path in a measuring direction so as to scan the first measuring graduation, the second assembly being installable on a second object to be measured such that a position of the first object relative to the second object is measurable; and
   at least one second scanning unit mounted on the profiled element so as to enable the second measuring graduation to be scanned, the at least one second scanning unit being positioned in a way that allows the first scanning unit to traverse collision-free along the travel path at a distance spaced apart from the at least one second scanning unit orthogonally to the measuring direction such that a displacement of the scale relative to the first object is measurable.

2. The position-measuring device as recited in claim 1, further comprising a plurality of second scanning units which are mutually spaced apart in measuring direction and fastened to the profiled element.

3. The position-measuring device as recited in claim 1, wherein the at least one second scanning unit is resiliently joined in the measuring direction to the profiled element.

4. The position-measuring device as recited in claim 3, wherein the at least one second scanning unit is fastened to the profiled element by a flexure joint that is deflectable in the measuring direction.

5. The position-measuring device as recited in claim 1, wherein the at least one second scanning unit is installed within a recess of the profiled element.

6. The position-measuring device as recited in claim 1, wherein the profiled element is a hollow profiled element with an interior space forming the travel path of the first scanning unit, the scale being disposed within the interior space.

7. The position-measuring device as recited in claim 1, wherein the profiled element is a hollow profiled element with an interior space forming the travel path of the first scanning unit, the scale being disposed within the interior space, and wherein the at least one second scanning unit is installed within a recess of the hollow profiled element, and wherein a seal is provided between the hollow profiled element and the at least one second scanning unit.

8. The position-measuring device as recited in claim 1, wherein the scale is immovably fixed in position on the profiled element at solely one single position and, in a remaining region, is configured on the profiled element in a way that allows the scale to expand relative to the profiled element in the measuring direction.

9. The position-measuring device as recited in claim 1, wherein the second measuring graduation and the at least one second scanning unit are configured to enable an opto-electric scanning of the second measuring graduation.

10. The position-measuring device as recited in claim 1, wherein the first measuring graduation is disposed on one side of the scale and the second measuring graduation is disposed on a rear side of the scale.

11. The position-measuring device as recited in claim 1, wherein the first measuring graduation is disposed on one side of the scale and the second measuring graduation is disposed on the same side next to the first measuring graduation.

12. The position-measuring device as recited in claim 1, wherein the scale is a scale tape.

13. The position-measuring device as recited in claim 12, wherein the scale is a metal scale tape.

14. The position-measuring device as recited in claim 1, wherein the scale is a scale tape disposed in a longitudinal groove of the profiled element.

15. The position-measuring device as recited in claim 1, wherein the scale is a scale tape fixedly secured at one end to the profiled element and tensioned at the other end.

* * * * *